Jan. 8, 1963   J. A. FOSTER, SR., ET AL   3,071,993
TUBE JOINTS AND MEANS AND METHOD OF MAKING THE SAME
Filed July 8, 1959
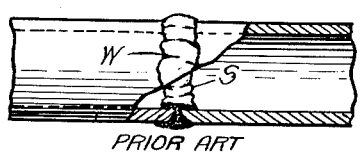
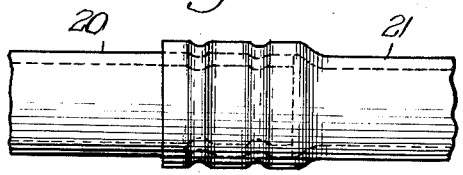
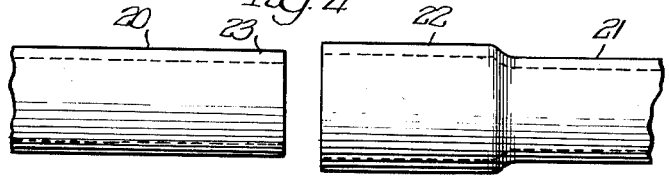
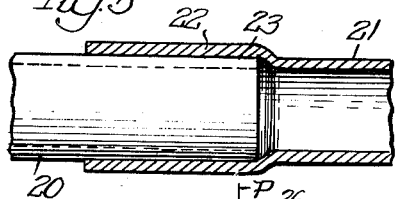
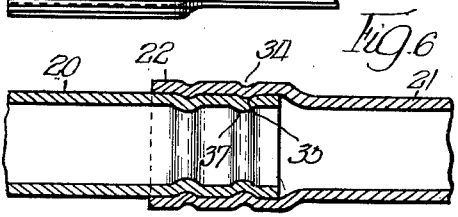
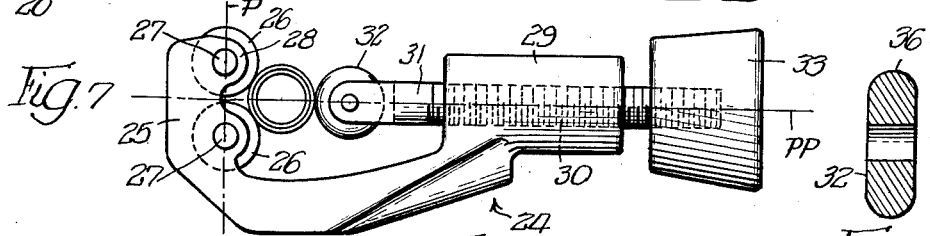
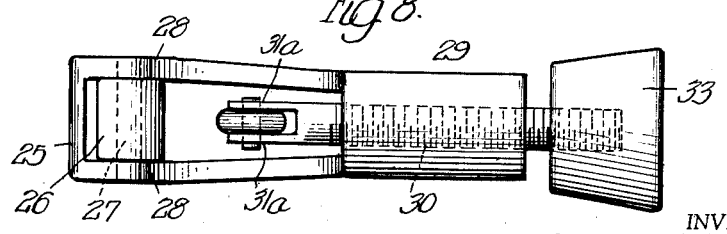
INVENTORS.
James A. Foster, Sr
BY Joseph Papa.
Brown, Jackson, Boettcher & Dienner
Attys

| United States Patent Office | 3,071,993
Patented Jan. 8, 1963 |
|---|---|

3,071,993
TUBE JOINTS AND MEANS AND METHOD OF MAKING THE SAME
James Alfred Foster, Sr., and Joseph Papa, Elkhart, Ind.
Filed July 8, 1959, Ser. No. 825,830
2 Claims. (Cl. 81—15)

This invention relates to a novel tube joint and more particularly involves new and novel means and method of joining tubes of ductile metals such as aluminum or copper to obtain a tight connection therebetween which will be effective against pressurized fluid flowing through the joined tubes.

Previous to our invention, metal tubings were conventionally joined by welding. However, not only is welding an expensive time-consuming process, but special difficulties have been met in working with copper or aluminum. Although some success has been met in welding copper through a "sweating" process, the art has been less successful in the case of aluminum. Generally speaking, a stable weld can be obtained only with difficulty on either of these metals, and then only when the operator is highly experienced.

Thus, a first and principal object of our invention is to provide a conveniently simple and economical, practical process of joining copper and/or aluminum tubing. More particularly, the object of our invention was to provide a substitute process for welding which even the unskilled worker could satisfactorily practice to obtain an effective tight joint between tubing of such materials which previously had been so troublesome to work with.

In accomplishing these objects, it was our proposal to take advantage of the ductile property of these materials by initially swedging the end of one piece of tubing in order to enlarge it sufficiently that it might be tightly fitted over the unexpanded end of a second piece of tubing. Thereafter, we proposed to apply pressure through a simple tool which we moved in rotary fashion about the tightly assembled ends to effectively flow the material of the assembled ends into a circumferentially extending continuous channel, which deformation would occur simultaneously and coincidentally in the assembled ends to obtain a mechanical interlocking thereof, and which interlocking we have found is sufficient to provide a joint resistant to internal pressures as high as 2500 p.s.i.

Not only have we found that through this combined swedging and spinning method of joining ductile tubing, can we obtain superior joints than previously thought possible, but the joinder between the tubing pieces can be obtained conveniently and economically by workmen of little skill and using simple uncomplicated tools. The invention, we have found, therefore results in considerable savings both of materials and labor costs.

We have further found that not only can an unskilled operator quickly and efficiently join copper and aluminum tubing in this manner, but that it is also relatively simple to repair a joint by simply "re-rolling"; thus eliminating the necessity of shutdowns, which are normally necessary for rewelding a leaky joint.

Moreover, we have also found that a much smoother joint can be obtained, so that there is less friction loss or turbulent flow as the fluid passes through tubing joined by our method in comparison with the passage of fluid through welded tubing. In a welded joint, inherently there remains a certain amount of roughness from the internally located portion of the weldment which cannot be removed or smoothed. This represents a further advantage our invention has over prior art methods of joining pipes or tubing by welding.

The above discussed features and advantages obtained through the practice of our invention represent further and more specific objects thereof. Many other features and/or advantages of the invention will also be apparent, or will become so, from the more specific description of the invention which now follows.

In the drawings:

FIGURE 1 is a fragmented view partly in section to illustrate a prior art method of welding two pieces of tubing or pipe;

FIGURE 2 is a fragmented view of two pieces of ductile metal tubing joined in accordance with our invention;

FIGURES 3–6 illustrate the various steps followed in the practice of the invention. Thus FIGURE 3 shows two pieces of tubing ready for joining. FIGURE 4 illustrates one of the tubing pieces having an end which has been expanded to receive an end of the other tubing piece. FIGURE 5 illustrates the expanded end of said one tubing piece fitted over the unexpanded end of the other tubing piece and FIGURE 6 is a sectional view which illustrates the manner in which the assembled end of the two tubing pieces are deformed to obtain the desired mechanical interlocking;

FIGURE 7 shows a spinning tool used to form the interlocking channels in the assembled ends of the two tubing pieces as shown in FIGURE 6;

FIGURE 8 is a view of the same tool taken at right angles to the view thereof in FIGURE 7; and FIGURE 9 is an enlarged view taken in section through the channel inducing wheel of the tool as indicated at lines 9—9 in FIGURE 7.

Referring more particularly to FIGS. 2 through 6 wherein like parts are identified by like reference numerals, 20 and 21 represent two pieces of tubing of essentially the same internal and external dimensions and which for the purposes of illustrating the invention may be considered to have a wall thickness of approximately 0.065 inch. Said pieces of tubing 20, 21 may be of copper, aluminum, or other ductile metal. In order to join the two pieces, one end of one of the tubing pieces, for example piece 21, is enlarged as at 22 (FIG. 4) by means of a swedging tool (not shown) sufficiently that its internal diameter becomes approximately equal to the external diameter of the other tubing piece 20 for a distance of an inch or so whereby the unexpanded end 23 of a second tube 20 may be tightly assembled within said enlarged end 22. (FIG. 5.) This joint is then completed by developing one or more circumferentially channels in said assembled ends 22, 23 using a spinning tool such as shown in FIGS. 7, 8 and 9.

Such a tool as there shown comprises a main frame of generally U-shape, one leg 25 of which supports a pair of adjacently located rollers 26, 26 rotatably mounted about spaced parallel spindles 27, 27 each supported between a pair of spaced ear portions 28, 28 on said leg 25. The other leg 29 of said frame 24 comprises an elongated stem having a central internally threaded bore 30 extending axially therethrough in a direction normal to a plane P defined by the axes of spindles 27, 27 about which rollers 26, 26 rotate and an extension of which bore would intersect said plane P essentially midway between said axes. In said bore 30 is threadedly secured a rod 31 having spaced bifurcations 31a at one end between which is supported a freely rotatable wheel 32 of high carbon steel or the like. The axis about which said wheel 32 turns is also parallel with the axes of rotation of rollers 26 and 27 and lies in a plane PP including the axes of bore 30 and rod 31 which is normal to and intersects plane P at a location midway of the axes of rotation of rollers 26, 26. On the outer end of rod 31 is fixed a knob 33 which may be turned to feed rod 31 inwardly and outwardly of bore 30 to effectively clamp the assembled ends 22 and 23 of said tubing pieces 21 and 20 (shown in FIG. 7) between said rollers 26, 26 and wheel 32. By turning knob 33, spinning wheel 32 may be adjusted inwardly toward rollers 26, 26 to exert a pressure on the assembled ends 22, 23 held therebetween and spaced rollers 26 and 27. Consequently, as the tool is rotated about said assembled ends 22, 23, and by continually adjusting knob 33, spinner wheel 32 may be caused to exert more and more pressure on end 22, forcing the metal thereof to be spun into a narrow depression or continuous circumferentially-extending groove 34 about the periphery thereof. As the tool is rotated about said assembly, pressure of wheel 32 thereon is increased through adjustment of knob 33 to induce the material of the outer end to flow into the form of continuous channel or groove 34. Simultaneously, said pressure is translated to the inner one 23 of said assembled tube ends so that a similar groove or channel 35 coincident with the resulting warped portion 34 in end 22 is simultaneously developed in said end 23. The two coincidental grooves or annular deformations thus formed obtain an intimate contact which provides a mechanical interlock between the two tightly assembled tubing ends 22 and 23 which we have found to be extremely resistant to breakdown when fluids are passed therethrough under high pressures as aforementioned.

Although it is contemplated that other spinning depths may be used, and our invention is not to be considered as therefore so limited, we have found that 0.043 inch represents the best working depth to which grooves 34 should be formed particularly with aluminum or copper tubing of the aforementioned 0.065 inch wall thickness. This depth we have found provides the required intimate contact of the coinciding annular deformation of the two ends without any shearing of the material in the deformed area of the tubing pieces. Moreover we have found that the slight bulge which appears at 37 on the inner side of the inner one 23 of said assembled ends remain sufficiently smooth as to minimize friction losses in the fluids which pass through the thus joined tubing. Although a single pair of coinciding annular deformations or grooves 34 and 35 has been found sufficient to obtain the required tight joint, we prefer, particularly when the tubing is to be utilized for the passage of fluids under relatively high pressures, to provide two and, in some instances, even three pairs of spaced coincidental grooves. At the spinning depths aforementioned, we have found that joints formed in accordance with our invention will resist internal pressures up to 2500 pounds per square inch gauge although the mean average bursting point is more normally 2200 pounds per square inch. Although we have successfully applied our invention thus far on both aluminum and copper tubing up to 2 inches in diameter, it will be readily apparent that the inventive process will be applicable to any size of tubing limited only by the size of the tools available to perform the swedging (FIG. 4) and annular channeling of the assembled ends (FIG. 6).

The best results we have found are obtained when the channel inducing surface 36 of the spinning wheel 32 is carefully controlled to comprise a true semi-circle in section (FIG. 8) having a radius of $^{10}\!/_{32}$ inch. The width of cylindrical rollers 26, 26 is, however, not critical although they must have a width greater than the width of spinning wheel 32 and be less wide than the width of the assembled ends 22 and 23 in order to obtain the most stable mounting possible of the tool about said assembled ends during the channel inducing operation.

One of the advantages we have noted in limiting the size of the spinning wheel 32 as aforementioned and in controlling the depth of the channel induced in the outer surface of end portion 24 is that the joining of the two ends can be obtained through the aforedescribed mechanical interlocking without the development of any substantial bulging on the internal side of the assembled ends as at 37. In any event, the bulge or ridge which appears at 37, we have found remains essentially smooth and does not have the roughness which is characteristic of the portion of the weldment W left on the internal side of the welded joint shown in FIG. 1 at S and which for obvious reasons is uncontrollable. Such a roughened surface in the past has been a constant source of annoyance in that it not only materially reduced the orifice size of the tubing but also provided a source of turbulence and constituted means by which bits of sediment or other solid matter present in fluid passed through the joined tubing might catch and eventually build up to an extent sufficient to interfere with the free passage of fluid. This smooth character of annular surface 37 avoids any such disadvantage.

One of the more important advantages of the type of joint obtained by the present invention is that if perchance a leak develops at the joint, it can be readily repaired without the necessity of shutting down the line or at least a particular section thereof since the joint can be simply rolled using the tool shown in FIGS. 7 and 8 as aforementioned in order to reseal the joint.

From the aforesaid description it will be apparent that convenient, simple and practical means have been shown and described for economically and practically joining pieces of metal tubing and which tubings were previously thought joinable only with extreme difficulty and then only by experienced operators.

Thus it will be apparent that all of the objects and advantages as well as features of the invention have been demonstrated as obtainable in a convenient and simple practical manner. It will furthermore be understood that the above description is not to be taken in a limiting sense but merely as illustrative of one form of the invention and that various modifications and variation in the steps of the process and parts of the apparatus described may be had within the spirit of the invention and are intended to be included within the scope of the invention as defined by the appended claims.

Having described our invention, we claim:

1. A tool for joining the telescoped ends of ductile metal tubing comprising a frame member having a pair of spaced leg portions to straddle telescoped tubing ends, a pair of adjacently spaced continuously smooth cylindrical rollers rotatably mounted on the inner side of one of said leg portions and transversely thereof, the axes about which said rollers are rotatable being in spaced parallel relation and defining a first plane, said cylindrical rollers being adapted to provide spaced continuous linear engagements longitudinally along one side of telescoped tubing ends when straddled by the leg portions of the frame, a channel inducing wheel, and means supporting said wheel on the other leg portion of the frame for engagement with the side of the said telescoped tubing ends opposite that engaged by the rollers, said means supporting said channel inducing wheel for free rotation about an axis parallel to the axes of said rollers and in a plane disposed normal to and intersecting said first plane substantially midway of the axes of the two rollers, said means being adjustable toward said first plane to permit the straddled telescoped tubing ends to be tightly gripped between the rollers and channel inducing wheel, the outer periphery of said channel inducing wheel comprising a true semi-circle in section which effectively flows the ductile metal of the telescoped tubing ends into a circumferentially extending continuous channel when the telescoped tubing ends are tightly gripped between said wheel and rollers and the tool is moved about said telescoped tubing ends in rotary fashion, the outer periphery of said channel inducing wheel having a width materially less than that of the rollers and being centered with respect to the width of said rollers so that the spaced linear engagements of the rollers stabilize the tool in the channel inducing operation.

2. A tool according to claim 1 wherein said outer periphery of the channel inducing wheel comprises a semi-circle in section having a radius of about ten thirty-seconds inches.

(References on following page)

References Cited in the file of this patent

UNITED STATES PATENTS

| | | |
|---|---|---|
| 1,512,394 | Bowers | Oct. 21, 1924 |
| 1,724,509 | Nelson | Aug. 13, 1929 |
| 1,768,095 | Arthur | June 24, 1930 |
| 1,797,691 | Merrill | Mar. 24, 1931 |
| 1,889,795 | Smith | Dec. 6, 1932 |
| 2,085,710 | Tormblom | June 29, 1937 |
| 2,095,310 | Brandt | Oct. 12, 1937 |
| 2,121,558 | Coe | June 21, 1938 |
| 2,192,914 | Ice | Mar. 12, 1940 |
| 2,367,206 | Davis | Jan. 16, 1945 |
| 2,453,126 | Forcier | Nov. 9, 1948 |
| 2,813,442 | Wingate | Nov. 19, 1957 |
| 2,821,415 | Race | Jan. 28, 1958 |
| 2,948,170 | Kemp | Aug. 9, 1960 |

FOREIGN PATENTS

| | | |
|---|---|---|
| 523,810 | France | Apr. 29, 1921 |
| 778,367 | Great Britain | July 3, 1957 |